US011837382B2

(12) United States Patent
Pancheshnyi et al.

(10) Patent No.: US 11,837,382 B2
(45) Date of Patent: Dec. 5, 2023

(54) ELECTRICAL BUSHING

(71) Applicant: HITACHI ENERGY SWITZERLAND AG, Baden (CH)

(72) Inventors: Sergey Pancheshnyi, Zürich (CH); Sandra Haeberli, Lucerne (CH); Marcel Eugster, Glarus (CH)

(73) Assignee: HITACHI ENERGY LTD, Zurich (CH)

( * ) Notice: Subject to any disclaimer, the term of this patent is extended or adjusted under 35 U.S.C. 154(b) by 281 days.

(21) Appl. No.: 17/298,308

(22) PCT Filed: Dec. 12, 2019

(86) PCT No.: PCT/EP2019/084885
§ 371 (c)(1),
(2) Date: May 28, 2021

(87) PCT Pub. No.: WO2020/120671
PCT Pub. Date: Jun. 18, 2020

(65) Prior Publication Data
US 2022/0037062 A1 Feb. 3, 2022

(30) Foreign Application Priority Data
Dec. 12, 2018 (EP) .................... 18211975

(51) Int. Cl.
*H01B 17/28* (2006.01)
*H01B 7/28* (2006.01)
(52) U.S. Cl.
CPC ..................... *H01B 7/28* (2013.01)

(58) Field of Classification Search
CPC ........ H01B 17/28; H01B 17/26; H01B 17/30; H02G 15/072; H01F 27/04;
(Continued)

(56) References Cited

U.S. PATENT DOCUMENTS 3,462,545 A * 8/1969 Grimmer ............... H01B 17/28
174/143
3,823,334 A 7/1974 Philofsky et al.
(Continued)

FOREIGN PATENT DOCUMENTS

CN 103534766 A 1/2014
CN 204045296 U 12/2014
(Continued)

OTHER PUBLICATIONS

The Korean Intellectual Property Office Notice of Grounds for Rejection, Korean Patent Application No. 10-2021-7017769, dated Nov. 25, 2022, 5 pp.
(Continued)

*Primary Examiner* — Angel R Estrada
(74) *Attorney, Agent, or Firm* — Sage Patent Group

(57) ABSTRACT

Electrical bushing for medium and high voltage comprising a dielectric bushing main body a conductor extending through the bushing main body and being electrically insulated by the bushing main body, at least a conductive foil concentrically arranged around the conductor along at least a part of its length, and a barrier layer at least partially covering an edge region of said conductive foil, wherein the barrier layer has a dielectric strength greater than the dielectric strength of the dielectric bushing main body and greater than 150 kV/mm.

20 Claims, 3 Drawing Sheets

(58) Field of Classification Search
CPC ..... H01F 27/2828; H01F 27/02; H01R 13/53;
H01R 4/70; H01H 9/02; H01H 9/0264;
H01H 85/185; H01G 4/32
USPC ............ 174/143, 152 R, 142, 152 G, 153 G,
174/138 R, 139, 138 F, 137 R, 5 R,
174/14 BH; 16/2.1, 2.2
See application file for complete search history.

(56) References Cited

U.S. PATENT DOCUMENTS

| | | | |
|---|---|---|---|
| 4,370,514 A | 1/1983 | Matthaeus et al. | |
| 4,847,450 A | 7/1989 | Rupprecht | |
| 6,534,721 B2 * | 3/2003 | Hoefner | H01B 17/14 174/209 |
| 7,262,367 B2 * | 8/2007 | Donzel | H01B 17/42 174/152 R |
| 7,812,266 B2 * | 10/2010 | Rocks | H01B 17/265 16/2.2 |
| 7,964,799 B2 * | 6/2011 | Isberg | H01F 27/04 16/2.2 |
| 8,455,763 B2 * | 6/2013 | Dais | H01F 27/04 174/152 R |
| 8,749,949 B2 | 6/2014 | Caporaso et al. | |
| 8,809,686 B2 * | 8/2014 | Borjesson | H01B 17/28 174/149 R |
| 11,295,876 B2 * | 4/2022 | Engels | H01B 17/28 |
| 2013/0025911 A1 | 1/2013 | Borjesson et al. | |
| 2016/0133361 A1 | 5/2016 | Logakis et al. | |

FOREIGN PATENT DOCUMENTS

| | | |
|---|---|---|
| CN | 104900350 A | 9/2015 |
| CN | 105308688 A | 2/2016 |
| EP | 2375423 A1 | 10/2011 |
| JP | 2017016852 A | 1/2017 |

OTHER PUBLICATIONS

International Search Report and Written Opinion for the International Application No. PCT/EP2019/084885 dated Feb. 14, 2020, 15 pages.
A N Hammoud et al., "High Temperature Dielectric Properties of Apical, Kapton, Peek, Teflon AF, and Upilex Polymers", Oct. 18, 1992, XP055584826, 10 pages.
First Office Action for Chinese Invention Patent Application No. 201980081843X, dated Apr. 18, 2022, 20 pages.

* cited by examiner

ELECTRICAL BUSHING

CROSS REFERENCE TO RELATED APPLICATIONS

This application is a 35 U.S.C. § 371 national stage application of PCT International Application No. PCT/EP2019/084885 filed on Dec. 12, 2019, which in turns claims foreign priority to International Patent Application No. 18211975.0, filed on Dec. 12, 2018, the disclosures and content of which are incorporated by reference herein in their entirety.

FIELD

Embodiments of the present disclosure relate to an electrical bushing operating in the field of the medium and high voltage technology. Also, the embodiments of the present disclosure relate to an electric medium or high voltage gear comprising said electrical bushing as well as to a medium or high voltage power transmission and distribution systems comprising said electrical bushing.

BACKGROUND

An electrical bushing is an insulating device used to conduct electrical current safely through a grounded barrier such as a transformer housing, building wall or similar. In particular, high voltage bushings are employed for carrying current at high potential through the grounded barrier that is at different potential than the current path. To improve the performance of high voltage bushings, thereby smoothening the electrical field distribution between the conductor and the grounded barrier, the bushings can comprise thin coaxial foils or meshes surrounding the high voltage conductor and separated by a dielectric insulating material. The foils can be made of metal or any other material with a sufficiently high electrical conductivity, such as plastic with a conductive filler. These foils can be inserted during a winding process to form a so-called condenser core. Alternatively, conductive layers can be applied directly on the spacing material using, for example, printing technologies. In both cases, these metal foils or conductive layers produce a capacitive effect which leads to a more uniform radial electrical field distribution between the central high voltage conductor and the grounded layer or flange. This reduces the risk of dielectric failure.

However, the employment of thin conductive layers in a high voltage bushing structure leads to a significant field enhancement near the edges of the layers. Locally, the field enhancement can be as high as several tens or even hundreds of times compared to the average field between the layers.

It is known that the electric field at the foils edges of a bushing condenser core can be graded by acting on the edges of the foils. For example, EP 2 375 423 A1 discloses a bushing, wherein a portion of the edge of a conductive foil comprises a field grading material (FGM) such as polymer composites that is in electrical contact with said foil. The electrical field at the foil edge is thus graded by the FGM at local electric field strengths above the electric field threshold of the field grading material.

On the other hand, U.S. Pat. No. 4,370,514 A discloses a bushing having double layer foils containing an electrically conducting layer and an insulating layer with a high dielectric constant. At the foil edges, the double layer foils are folded so that the insulating layer encloses the electrically conducting layer to improve the ability of the bushing to withstand partial corona discharges and surge voltages.

Although these documents describe devices that efficiently reduce the field stress at the edges of the bushing using materials with particular properties in terms for example of dielectric permittivity, none of them addresses the problem of the rather weak electrical and mechanical interface between the foil edge and the insulating material. It is commonly believed that the main dielectric failure mode of dry condenser bushings is the disruptive discharge initiated at the edges of said conductive layers, due to the presence of sharp edges.

SUMMARY

It is an object of the present invention to provide an electrical bushing, an electric medium or a high voltage gear and a medium or a high voltage power transmission or distribution system, which may solve one or more problems set forth above and other problems in the art, to particularly prevent discharge initiation, without affecting the physical properties of the bushing itself.

The object is achieved by the features of the respective independent claims. Further embodiments are defined in the respective dependent claims.

According to one embodiment of the present disclosure, an electrical bushing for medium and high voltage is provided. The electrical bushing comprises a dielectric bushing main body, a conductor extending through the bushing main body and being electrically insulated by the bushing main body, at least a conductive foil concentrically arranged around the conductor along at least a part of its length, and a barrier layer at least partially covering an edge region of said conductive foil. In particular, the barrier layer has a dielectric strength greater than the dielectric strength of the dielectric bushing main body and greater than 150 kV/mm, and wherein the barrier layer comprises a polyimide material, including Kapton, Apical, Upilex, or the like. According to this configuration, the dielectric strength stays within the specified condition (e.g., greater than 150 kV/mm) over a range of temperature up to 200° C. A lower limit for this range of temperature is not relevant, but the lower limit could be defined as room temperature (20° C.) if necessary.

With the term electrical bushing for medium and high voltage is intended bushing for ≥1 kV, preferably ≥52 kV rated voltage.

In this way, it is possible to cope with the problem of the sharp surfaces at the edges of the conductive foil without strongly modifying the physical and structural properties of the bushing. In fact, the barrier layer can cover just a limited portion of the edge region and can be placed directly or in close vicinity to critical edges with a sharp profile. Therefore, it is not strictly required to act on the curvature of the edges, for example by bending the conductive foils, that would certainly increase the total dimension or influence the grading quality of the bushing.

The barrier layer is made of a material having a high dielectric and thermal withstand, mechanical and chemical resistivity. Specifically, the barrier layer has a dielectric strength greater than a certain value in order to create a protection barrier to suppress possible discharge channel initiation. According to the present disclosure, the dielectric strength is definitely greater than the dielectric strength of the main body, that is of the main insulating material of bushing and can in particular be greater than 150 kV/mm. In some cases the dielectric strength can be greater than 250 kV/mm or even be greater than 300 kV/mm. As mentioned above, these values of high dielectric withstand stress are fulfilled over a wide range of temperatures, up to 200° C. or even up to 300° C. In case of polymer material, the glass transition temperature shall be higher than 250° C. or even 350° C. This is an evident difference from prior art systems that use materials having a glass transition temperature lower than 160° C. These high values of dielectric strength can be achieved due to the material selected and its material properties.

The above-mentioned values preferably refer to an AC dielectric strength. However, the same concept can also apply for any type of voltage, i.e. DC voltage or a combination of AC and DC voltages.

The application of a such barrier layer only to a limited portion of the edge region of the conductive foils affects the dimension of the high voltage bushing. In this way, in fact, it is possible to design electrical bushing having a slimmer profile. This leads to a material cost reduction and to an improvement of the thermal performances at the same time. Since the main heat is released in the metal conductor in the middle of bushing, cooling mostly occurs, due to convection, at external surface of bushing toward ambient medium such as air or oil. The heat conductivity of insulator is quite low, e.g. compared to metals. Therefore, conductor in thick bushings will be at higher temperatures than in thin bushings at the same current.

Advantageously, the configuration of the electrical bushing according to the present application makes possible a reduction in the sensitivity to the quality of the edge finishing, due to the presence of micro defects, etc., and determines an increase in reliability of the overall system.

It is noted that the interface between the edge of the conductive foils and the matrix material is typically made of epoxy with some spacing material (e.g. paper, polymeric woven or non-woven material) and, optionally, inorganic filler. Therefore, the electric field at the edges is additionally enhanced due to the presence of other materials in the so-called "triple point", the place where three or more materials with different dielectric permittivity meet. Covering the edge region of the conductive foil with the barrier layer according to the present disclosure strongly reduces the risk of discharge inception due to an electric field homogenization by excluding triple points and due to a superior dielectric withstand of the barrier layer.

According to some embodiments of the present disclosure, which can be combined with other embodiments described herein, the barrier layer can be a tape-like layer applied to the edge region of the conductive foil.

In this way, it is possible to easily apply the barrier material to the critical portions at the edges of the foil. Based on the situations, the tape-like layer can be applied to the entirety of the edge profile or only in some particular portions of the edge region of the conductive foil. Furthermore, the dimension of the edge region covered by the tape-like layer can vary based on the necessity and the structural characteristic of the foil edges. For example, the distance d between the edge of the conductive foil and the internal border of the tape-like layer applied to the foil and covering the edge region can have an average value between 1 mm and 5 mm. Of course, the covered region can extend also along the entire length of the foil.

In particular, the tape-like layer can comprise a functional layer and an adhesive layer covering at least in part said functional layer. The functional layer has the physical and chemical properties of the barrier layer according to the present disclosure. In other words, the functional layer is made of a material having a dielectric strength greater than the dielectric strength of the bushing main body and in particular greater than 150 kV/mm. The adhesive layer can be present on both sides or just one side of the functional layer and basically serves to attach the functional layer to the edge region of the conductive foil. The adhesive layer can be made of any suitable adhesive material. The thickness of the adhesive layer cannot be more than 500 Preferably, the thickness of the adhesive layer can be less than 150 most preferably than 30 µm.

According to another embodiment of the present disclosure, the barrier layer can be a coated layer applied to the edge region of the conductive foil. This can be performed using known coating techniques. In this way, the barrier layer can be uniformly or non-uniformly deposited on the critical edge region. Most importantly, this allows the regularity of foils positions that can be disturbed by thin and/or irregular coating layers. Also, the barrier layer does not increase the thickness of the edge region by using additional material, such as adhesive layer, as described above. This reduce the dimensions and the total weight of the bushing. The coating can be carried out using a liquid material element having a dielectric strength greater than the dielectric strength of the dielectric bushing main body and in particular greater than 150 kV/mm.

Based on the situations, the barrier layer can be coated on the entirety of the edge profile or only in some particular portions of the edge region of the conductive foil. Furthermore, the dimension of the edge region coated with the barrier layer can vary based on the necessity and the structural characteristic of the foil edges. For example, the distance d between the edge of the conductive foil and the internal border of coated edge region can have an average value between 1 mm and 5 mm. Of course, the coated region can extend also along the entire length of the foil.

It is possible to combine this coating technique with the above-mentioned technique of applying a tape-like layer as barrier layer. For example, some of the conductive foils can comprise a barrier layer formed by a tape-like layer and other conductive foils can comprise a barrier layer formed by a coating layer.

As mentioned above, the barrier layer can comprise a polyimide material, such as Kapton, Apical, Upilex, or the like. In principle, any material can be used for the barrier layer that satisfy the above-mentioned requirements regarding the dielectric strength.

According to some embodiments of the present disclosure, which can be combined with other embodiments described herein, the barrier layer can have a thickness lower than 500 µm, preferably lower than 100 µm. In this way, the total dimension of the electrical bushing as well as the total weight are not critically affected by the presence of the barrier layer. It is pointed out that the thickness refers to the layer having the dielectric strength properties as described above. For example, as regards the embodiment related to the employment of a tape-like layer, these maximum thickness values preferably refer to the functional layer and exclude the adhesive layer. Most importantly, the above-mentioned thickness values allow a more regular foils winding.

According to some embodiments of the present disclosure, which can be combined with other embodiments described herein, the edge region of the conductive foil can comprise an outer edge surface and an inner edge surface, wherein the barrier layer covers at least partially both the outer edge surface and the inner edge surface. The term "outer edge surface" and "inner edge surface" is intended in this contest relative to the inner core of the electrical bushing. In other words, the "inner edge surface" is defined by the surface of the conductive foil at the edge region facing the internal part of the bushing, for example facing the conductor extending through the bushing. On the other hand, the "outer edge surface" is defined by the surface of the conductive foil at the edge region—opposite to the inner edge surface—facing the external part of the bushing, for example an external cladding element. In this way, the barrier layer covers both sides (inner surface and outer surface) of the edge region of the conductive foil. The barrier layer can cover the edge region of the conductive foil at different points, i.e. at different distances from the edge, with respect to one side or the other side of the foil. For example, this can be useful in case one side of the conductive layer comprises more micro defects than the other side. Accordingly, the barrier layer can cover a wider, i.e. deeper, region on one side of the conductive foil at the edge region and a narrower, i.e. less deep, region on the other side of the conductive foil.

In particular, the barrier layer can comprise a U-shaped single layer folded around the edge region of the conductive foil. The U-shaped single layer comprises therefore two extremities, wherein one extremity is in contact with the inner edge surface of the edge region of the conductive foil and the other extremity is in contact with the outer edge surface of the edge region of the conductive foil so that the barrier layer is folded around the critical sharp edge of the conductive foil. In this case, the barrier layer is configured to avoid the presence of trapped air in the folded portion of the barrier layer. Such a configuration allows efficient results in terms of creating a protection barrier to suppress discharge channel initiation, without critically increasing the dimension and the manufacturing costs of the electrical bushing.

According to another embodiment of the present disclosure, the barrier layer comprises two separated sublayers sandwiching the edge region of the conductive foil. The two sublayers can be arranged parallel or almost parallel to each other. In this case, there are no folded portion of the barrier layer and the risk of trapped air is completely avoided.

According to another embodiment of the present disclosure, the edge region can comprise an outer edge surface and an inner edge surface, wherein the barrier layer covers only one of the outer edge surface or the inner edge surface. In this way, it is possible to reduce the material used for the barrier against the discharge channel initiation.

According to some embodiments of the present disclosure, which can be combined with other embodiments described herein, the edge region of the conductive foil can be folded back, wherein the barrier layer at least partially covers said folded edge region. In this way, problems related to the sharp edges of the conductive foils are further reduced. It is noted that, although a folded conductive foil would increase the thickness at the edge region, the barrier layer only covers a limited portion of said folded foil at the edge region. As mentioned above, the covered region can extends from the edge of the foil 1 mm or more. Therefore, with respect to known devices having a reliability almost comparable, the electrical bushing according to the present application has a reduced weight and reduced dimension.

According to some embodiments of the present disclosure, which can be combined with other embodiments described herein, the bushing can comprise a plurality of concentrically arranged conductive foils, each conductive foil having a first edge region at one side of the conductive foil and a second edge region at the opposite side of the conductive foil, wherein the barrier layer covers the first and the second edge region of each conductive foil. It is noted that in a configuration with a plurality of conductive foils, the single foils can be covered by the barrier layer exactly in the same manner or differently based on the embodiments described above in any possible combination. For example, one or more conductive foils can be covered by a tape-like layer as barrier layer, whereas other conductive foils of the same electrical bushing can be covered by a coated barrier layer. Similarly, some of the conductive foils can comprise a barrier layer covering both sides of the foils (inner edge surface and outer edge surface), whereas other conductive foils can comprise a barrier layer covering only one side of the barrier layer (inner edge surface or outer edge surface). For example, in a configuration with a plurality of coaxial conductive foils, the barrier layer can only cover a portion of the inner edge surfaces of each foil or only a portion of the outer edge surfaces of each foil. In another configuration, the barrier layer can cover in an alternate way the outer and the inner edge surfaces of the foils. Also, some of the conductive foils can comprise a folded barrier layer, whereas other conductive foils can comprise a not-folded barrier layer.

According to another embodiment of the present disclosure, an electric medium or high voltage gear comprising the electrical bushing according to any one of the embodiments described above is provided.

In particular, the electric medium or high voltage gear can be selected from the list comprising a dry transformer, an oil transformer, a gel transformer, and a gas-filled transformer.

According to a further embodiment of the present disclosure, a medium or high voltage power transmission or distribution system comprising an electrical bushing according to any one of the embodiments described above is provided.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Only the differences with respect to individual embodiments are described. Each example is provided by way of explanation of the disclosure and is not meant as a limitation of the disclosure. Further, features illustrated or described as part of one embodiment can be used on, or in conjunction with, other embodiments to yield yet a further embodiment. It is intended that the description includes such modifications and variations.

Figure 1:
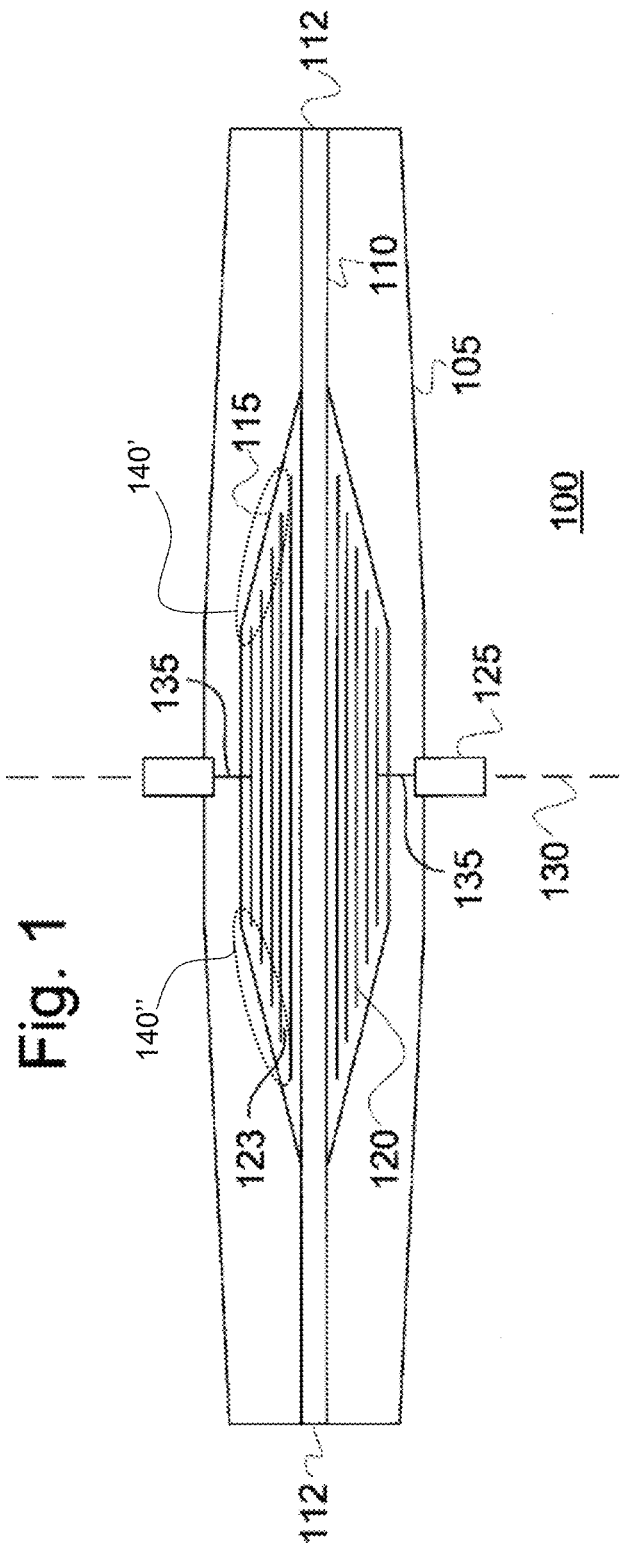
FIG. 1 shows a schematic view of an electrical condenser bushing according to the present disclosure.

FIG. 1 schematically illustrates a bushing 100 comprising a hollow, elongate insulator or bushing main body 105 through which extends a conductor 110. At each end of the conductor 110 an electrical terminal 112 is provided for connecting the conductor 110 to electrical systems or devices. The bushing 100 furthermore comprises a condenser core 115. In FIG. 1, the conductor 110 has been shown to form part of the bushing 100. However, some bushings 100 do not include a conductor 110, but include a pipe-shaped hole in the conductor location in which a conductor 110 may be inserted. The conductor 110 can be a solid element or a hollow metal tube.

The condenser core 115 comprises a number of foils 120 which are separated by a dielectric insulator 123. The dielectric insulator 123 is typically made of a solid insulating material, such as oil- or resin impregnated paper or woven or non-woven synthetic. The foils 120 are typically coaxially arranged, and could for example be made of aluminum or other conducting material. The foils 120 could be integrated with the dielectric material, or separated from the dielectric material. The integration of the foils with the dielectric material could for example be achieved by means of a vacuum metallization process, or by applying conductive ink to the dielectric material. A condenser core 115 can for example be in the shape of a cylinder or of a cylinder having a conical end part as shown in FIG. 1. The foils are often of cylindrical shape. Oftentimes, the axial length of an outer foil 120 is smaller than the axial length of an inner foil 120.

The bushing of FIG. 1 further comprises a flange 125 to which the insulator 105 is attached. The flange 125 can be used for connecting the bushing 100 to a plane 130 through which the conductor 110 extends. The flange 125 is often electrically connected to the outermost conductive foil 120, as indicated in FIG. 1 by connection 135. The plane 130 may be connected to ground, or can have a potential which differs from ground.

When the bushing 100 is in use, the condenser core 115 acts as a voltage divider and distributes the field substantially evenly within the condenser core 115.

As shown in FIG. 1, each conductive foil 120 has a first edge region 140' at one side of the conductive foil 120 (right side in the figure) and a second edge region 140" at the opposite side of the conductive foil 120 (left side in the figure. The barrier layer 200 (not shown in the figure) covers both the first and the second edge region 140', 140" of each conductive foil 120.

Figure 2:
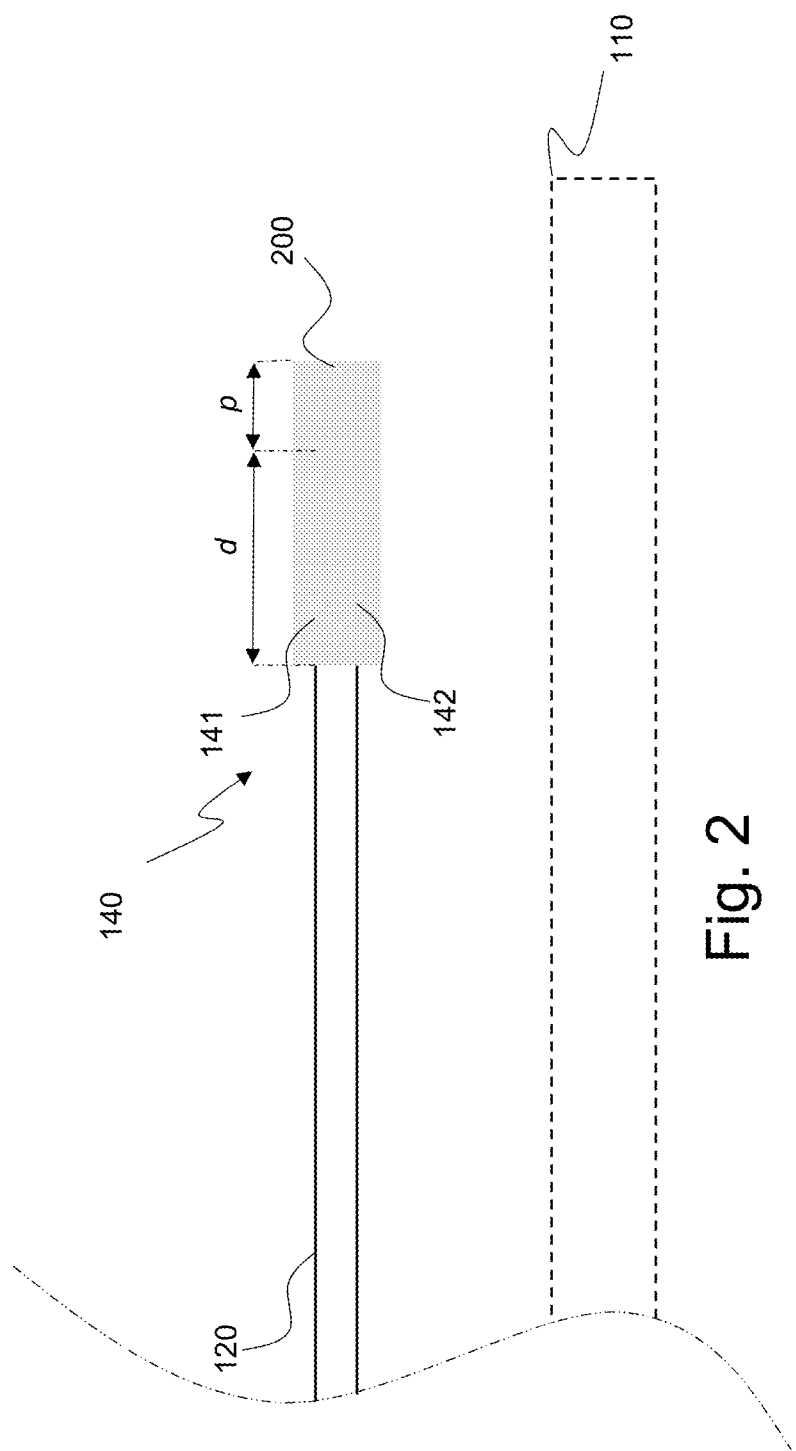
FIG. 2 shows a schematic view of a conductive foil with a barrier layer.

FIG. 2 shows a schematic representation of a single conductive foil 120 of an electrical bushing 100 according to the present disclosure. The figure in particular illustrates a detail of the edge portion 140 of the foil 120 relative to the position of the conductor 110. The barrier layer 200 covers the edge region 140 of the foil 120 in order to suppress discharge channel initiation due to the sharp edged of the conductive foil 120 in this region 140. The edge region 140 comprises an inner edge surface 142 in the direction of the conductor 110 and an outer edge surface 141 on the opposite side of the foil 120. According to the example shown in FIG. 2, the barrier layer 200 covers both the outer and the inner edge surfaces 141, 142 of the conductive foil 120 at the edge region 140.

In FIG. 2 the distance between the inner border of the barrier layer 200 in the edge region 140 and the edge of the conductive foil 120 is denoted with d. The value of this distance can be selected based on the foil characteristics. Preferably, the distance d has an average value between 1 mm and 5 mm. In the figure, the distance d is the same for the outer and the inner edge surfaces 141, 142. However, the distance at the outer edge surface 141 can be different from the distance at the inner edge surface 142. Also, FIG. 2 shows a configuration, wherein the barrier layer 200 protrudes beyond the edge of the conductive foil 120. The distance between the edge of the foil 120 and the outer protrusion is denoted with p. The value of the protrusion p can be different based on the different structural characteristics of the barrier layer 200.

As shown in FIG. 2, the barrier layer 200 covers just a limited portion of the edge region 140 and can be placed directly or in close vicinity to critical edges with a sharp profile of the conductive foil 120. The barrier layer 200 is made of a material having a high dielectric withstand. Specifically, the barrier layer 200 has a dielectric strength greater than a certain value in order to create a protection barrier to suppress possible discharge channel initiation. According to the present disclosure, the dielectric strength is to be greater than 150 kV/mm over a wide range of temperatures, up to 200° C. In case of polymer material, the glass transition temperature shall be higher than 250° C.

FIGS. 3A, 3B, 3C and 3D show different structural configurations of the barrier layer 200 covering the edge region 140 of the conductive foils 120.

Figure 3:
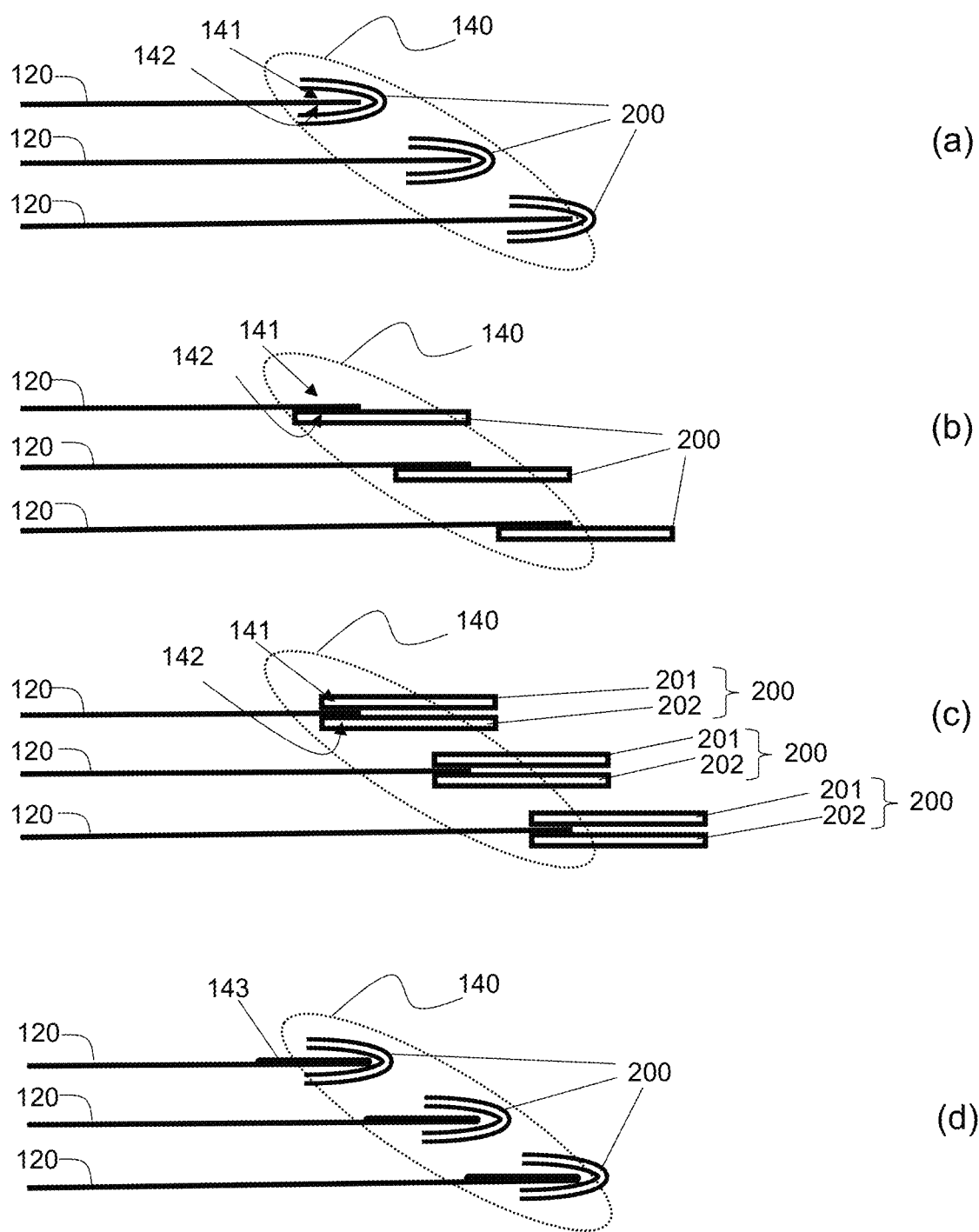
FIG. 3A shows a schematic view of three conductive foils with a U-shaped folded barrier.
FIG. 3B shows a schematic view of three conductive foils with a barrier layer covering only the inner edge surface of the edge region of each foil.
FIG. 3C shows a schematic view of three conductive foils with a barrier layer formed by two sublayers.
FIG. 3D shows a schematic view of three conductive foils having an edge region folded back, wherein the barrier layer is a U-shaped folded barrier.

According to FIG. 3A, the barrier layer 200 comprises a U-shaped single layer folded around the edge region 140 of the conductive foil 120. The folded barrier layer 200 covers both the outer edge surface 141 and the inner edge surface 142. This configuration can be achieved for example using a tape-like layer folded around the edge region 140, wherein the two extremities of the tape-like layer 200 are attached to the outer edge surface 141 and the inner edge surface 142 of the edge region 140, respectively.

According to FIG. 3B, the barrier layer 200 comprises a single layer covering only a portion of the inner edge surface 142 of each conductive foil 120.

According to FIG. 3C, the barrier layer 200 comprises a first sublayer 201 and a second sublayer 202. These are separated from each other and sandwich the edge region 140 of the foil 120. In particular, the first sublayer 201 covers a portion of the outer edge surface 141, whereas the second sublayer 202 covers a portion of the inner edge portion 142. The two sub-layers can have the same length or can be of different lengths.

FIG. 3D shows a configuration, wherein the conductive foils 120 have a folded back edge region 143. In particular, the edge of each foil 120 is bent onto itself. The barrier layer 200 comprises a U-shaped single layer folded around the edge region 140 of the conductive foil 120. Similar to FIG. 3A, the folded barrier layer 200 covers both the outer edge surface 141 and the inner edge surface 142. Of course, the barrier layer 200 can be of any configuration as in FIG. 3B and/or FIG. 3C.

It is noted that FIGS. 3A-3D illustrate different configurations of the barrier layer 200 relative to the edge region 140 of the conductive foil 120. In particular, it is noted that the distance d and the protrusion p vary based on the different configurations. For example, the distance d in the configuration of FIG. 3A can be greater compared to that of FIG. 3C. On the other hand, the protrusion p in the configuration of FIG. 3A can be lower compared to that of FIG. 3C.

The embodiments according to the present disclosure have several advantages including the possibility to improve the performance of an electrical bushing, in particular, by reducing the risk of partial or disruptive discharge inception near foil edges. Also, the device according to the present disclosure has the advantage of reducing the material costs and improving the thermal performances at the same time.

While the foregoing is directed to embodiments of the disclosure, other and further embodiments of the disclosure may be devised without departing from the basic scope thereof, and the scope thereof is determined by the claims that follow.

The invention claimed is:

1. An electrical bushing for medium and high voltage, the electrical bushing comprising:
   a dielectric bushing main body;
   a conductor extending through the dielectric bushing main body and being electrically insulated by the dielectric bushing main body;
   at least a conductive foil concentrically arranged around the conductor along at least a part of a length of the conductor; and
   a barrier layer at least partially covering an edge region of said conductive foil,
   wherein a distance between an inner border of the barrier layer and an edge of the conductive foil is based on foil characteristics,
   wherein the barrier layer has a dielectric strength greater than the dielectric strength of the dielectric bushing main body and greater than 150 kV/mm and wherein the barrier layer comprises a polyimide material, including Kapton, Apical, or Upilex, the value of the dielectric strength greater than 150 kV/mm being maintained over a range of temperature up to 200° C.

2. The electrical bushing according to claim 1, wherein the barrier layer is a tape-like layer applied to the edge region of the conductive foil.

3. The electrical bushing according to claim 2, wherein the tape-like layer comprises a functional layer and an adhesive layer covering at least in part said functional layer.

4. The electrical bushing according to claim 1, wherein the barrier layer is a coated layer applied to the edge region of the conductive foil.

5. The electrical bushing according to claim 1, wherein the barrier layer has a thickness lower than 100 m.

6. The electrical bushing according to claim 1, wherein the edge region of the conductive foil comprises an outer edge surface and an inner edge surface, the barrier layer at least partially covering both the outer edge surface and the inner edge surface.

7. The electrical bushing according to claim 6, wherein the barrier layer comprises a U-shaped single layer folded around the edge region of the conductive foil.

8. The electrical bushing according to claim 6, wherein the barrier layer comprises two separated sublayers sandwiching the edge region of the conductive foil.

9. The electrical bushing according to claim 1, wherein the edge region comprises an outer edge surface and an inner edge surface, the barrier layer covering only one of the outer edge surface or the inner edge surface.

10. The electrical bushing according to claim 1, wherein the edge region of the conductive foil is folded back, the barrier layer at least partially covering said folded edge region.

11. The electrical bushing according to claim 1, wherein the electrical bushing comprises a plurality of concentrically arranged conductive foils, each conductive foil having a first edge region at one side of the conductive foil and a second edge region at the opposite side of the conductive foil, wherein the barrier layer covers the first edge region and the second edge region of each conductive foil.

12. An electric medium or high voltage gear comprising an electrical bushing according to claim 1.

13. The electric medium or high voltage gear according to claim 12, being selected from the list comprising a dry transformer, an oil transformer, a gel transformer, and a gas-filled transformer.

14. A medium or high voltage power transmission or distribution system comprising an electrical bushing according to claim 1.

15. The electrical bushing according to claim 1, wherein the barrier layer has an outer protrusion beyond an edge of the conductive foil and a distance between the outer protrusion and the edge of the conductive foil is based on structural characteristics of the barrier layer.

16. The electric medium or high voltage gear according to claim 12 wherein the electrical bushing comprises a plurality of concentrically arranged conductive foils, each conductive foil having a first edge region at one side of the conductive foil and a second edge region at the opposite side of the conductive foil, wherein the barrier layer covers the first edge region and the second edge region of each conductive foil.

17. The electric medium or high voltage gear according to claim 12, wherein the barrier layer has an outer protrusion beyond an edge of the conductive foil and a distance between the outer protrusion and the edge of the conductive foil is based on structural characteristics of the barrier layer.

18. The medium or high voltage power transmission or distribution system according to claim 14 wherein the electrical bushing comprises a plurality of concentrically arranged conductive foils, each conductive foil having a first edge region at one side of the conductive foil and a second edge region at the opposite side of the conductive foil, wherein the barrier layer covers the first edge region and the second edge region of each conductive foil.

19. The medium or high voltage power transmission or distribution system according to claim 14, wherein the barrier layer has an outer protrusion beyond an edge of the conductive foil and a distance between the outer protrusion and the edge of the conductive foil is based on structural characteristics of the barrier layer.

20. The medium or high voltage power transmission or distribution system according to claim 14, wherein the edge region of the conductive foil comprises an outer edge surface and an inner edge surface, the barrier layer at least partially covering at least one of the outer edge surface and the inner edge surface.

* * * * *